United States Patent
DeFranks et al.

(10) Patent No.: US 9,901,185 B2
(45) Date of Patent: Feb. 27, 2018

(54) MATTRESS INCLUDING FLAT SPRINGS

(71) Applicant: DREAMWELL, LTD., Las Vegas, NV (US)

(72) Inventors: Michael S. DeFranks, Atlanta, GA (US); Rahul Kirtikar, Atlanta, GA (US); Julia S. Rasor, San Diego, CA (US)

(73) Assignee: DREAMWELL, LTD., Las Vegas, NV (US)

( * ) Notice: Subject to any disclaimer, the term of this patent is extended or adjusted under 35 U.S.C. 154(b) by 123 days.

(21) Appl. No.: 14/600,114

(22) Filed: Jan. 20, 2015

(65) Prior Publication Data

US 2015/0216317 A1   Aug. 6, 2015

Related U.S. Application Data

(60) Provisional application No. 61/934,188, filed on Jan. 31, 2014.

(51) Int. Cl.
| | |
|---|---|
| *A47C 7/28* | (2006.01) |
| *A47C 23/02* | (2006.01) |
| *A47C 23/00* | (2006.01) |
| *A47C 23/12* | (2006.01) |
| *A47C 27/06* | (2006.01) |
| *F16F 3/02* | (2006.01) |

(52) U.S. Cl.
CPC ............. *A47C 23/02* (2013.01); *A47C 7/28* (2013.01); *A47C 23/002* (2013.01); *A47C 23/12* (2013.01); *A47C 27/065* (2013.01); *F16F 3/023* (2013.01); *Y10T 29/49613* (2015.01)

(58) Field of Classification Search
CPC ....... A47C 23/00; A47C 23/02; A47C 23/002; A47C 23/12; A47C 23/05; A47C 23/0522; A47C 23/125; A47C 23/26; A47C 7/025; A47C 7/28; A47C 7/282; A47C 7/285; A47C 7/287; A47C 7/30; A47C 7/32; A47C 7/34; A47C 27/04; A47C 27/06; A47C 27/065; A47C 23/0438; A47C 23/15; A47C 23/155; F16F 3/02; F16F 3/023; B60G 11/08; B60G 11/34
USPC .................... 267/36.1, 7, 229, 246
See application file for complete search history.

(56) References Cited

U.S. PATENT DOCUMENTS

| | | | | |
|---|---|---|---|---|
| 66,849 | A * | 7/1867 | Johnson | A47C 23/002 5/248 |
| 88,070 | A * | 3/1869 | Partello | A47C 23/00 5/244 |

(Continued)

*Primary Examiner* — Nicholas F Polito
*Assistant Examiner* — David R Hare
(74) *Attorney, Agent, or Firm* — Cantor Colburn LLP

(57) ABSTRACT

Mattresses including a chassis core including a rigid or semi-rigid base sheet; a plurality of flat springs spaced apart from one another in parallel rows, wherein each one of the plurality of flat springs comprises a first terminal end, a second terminal end, and a flexible arcuate member extending from the first terminal end to the second terminal end, and wherein a center of an arc defined by the arcuate member is fixedly attached to the rigid base sheet; a body support disk disposed on each one of the first and second terminal ends. The body support disk supports the load of an individual. In some embodiments, the body support disk is pivotably connected to each terminal end.

27 Claims, 9 Drawing Sheets

(56) References Cited

U.S. PATENT DOCUMENTS

| | | | | |
|---|---|---|---|---|
| 1,389,100 A * | 8/1921 | Neale | B60G 11/04 | 267/3 |
| 1,483,214 A * | 2/1924 | Crockett | B60G 11/34 | 267/29 |
| 1,630,459 A * | 5/1927 | Zeidler | D06F 83/00 | 267/80 |
| 2,277,853 A * | 3/1942 | Kohn | A47C 27/065 | 267/80 |
| 2,313,171 A * | 3/1943 | Piliero | A47C 23/30 | 5/247 |
| 3,275,311 A * | 9/1966 | Sichel | F16F 1/02 | 267/163 |
| 3,879,025 A * | 4/1975 | Dillard | F16F 1/02 | 267/165 |
| 4,708,757 A * | 11/1987 | Guthrie | B32B 37/144 | 156/163 |
| 4,713,854 A * | 12/1987 | Graebe | A47C 27/144 | 297/DIG. 1 |
| 4,771,995 A * | 9/1988 | Wells | A47C 23/02 | 267/103 |
| 4,802,659 A * | 2/1989 | Hope | F16F 1/368 | 267/149 |
| 5,210,889 A * | 5/1993 | Wesemann | A47C 23/067 | 5/236.1 |
| 5,348,378 A * | 9/1994 | Zhang | A47C 7/025 | 267/154 |
| 5,409,200 A * | 4/1995 | Zingher | F16F 1/185 | 267/160 |
| 5,414,874 A * | 5/1995 | Wagner | A47C 23/002 | 5/263 |
| 5,426,799 A * | 6/1995 | Ottiger | A47C 23/002 | 267/151 |
| 5,558,314 A * | 9/1996 | Weinstein | A47C 23/002 | 267/142 |
| 5,588,165 A * | 12/1996 | Fromme | A47C 23/002 | 267/106 |
| 5,747,140 A * | 5/1998 | Heerklotz | A47C 27/144 | 248/630 |
| 5,785,303 A * | 7/1998 | Kutschi | A47C 23/00 | 267/103 |
| 5,787,533 A * | 8/1998 | Fromme | A47C 23/002 | 5/247 |
| 6,170,808 B1 * | 1/2001 | Kutschi | A47C 27/065 | 267/107 |
| 6,250,618 B1 * | 6/2001 | Greenhill | F16F 1/027 | 267/160 |
| 6,595,503 B1 * | 7/2003 | Cheng | F16F 1/187 | 267/160 |
| 6,647,574 B2 * | 11/2003 | Weber | A47C 23/065 | 267/103 |
| 7,338,039 B2 * | 3/2008 | Pfau | A47C 7/285 | 267/144 |
| 7,938,387 B2 * | 5/2011 | Fossati | A47C 23/002 | 267/142 |
| 8,540,224 B2 * | 9/2013 | Guthrie | B60G 11/00 | 267/164 |
| 8,668,189 B2 * | 3/2014 | Guthrie | B60G 11/00 | 267/164 |
| 8,800,979 B2 * | 8/2014 | DeFranks | A47C 23/002 | 267/103 |
| 8,813,279 B2 * | 8/2014 | Saunders | A47C 27/15 | 5/200.1 |
| 2003/0122293 A1 * | 7/2003 | Akhtar | F16F 1/185 | 267/36.1 |
| 2003/0196272 A1 * | 10/2003 | Weber | A47C 23/002 | 5/716 |
| 2004/0123384 A1 * | 7/2004 | Fromme | A47C 23/002 | 5/255 |
| 2007/0246873 A1 * | 10/2007 | VanDeRiet | A47C 7/022 | 267/142 |
| 2008/0128965 A1 * | 6/2008 | Bock | A47C 23/002 | 267/101 |
| 2009/0133195 A1 | 5/2009 | Elzenbeck et al. | | |

\* cited by examiner

MATTRESS INCLUDING FLAT SPRINGS

CROSS-REFERENCE TO RELATED APPLICATIONS

This application is a NON-PROVISIONAL of and claims the benefit of U.S. Application No. 61/934,188, filed Jan. 31, 2014, which is incorporated herein by reference in its entirety.

BACKGROUND

The present disclosure generally relates to mattresses and more particularly, to mattresses including flat springs and body support disks attached to terminal ends of the flat springs to provide support to a user thereof. The flat springs generally have an arcuate shape, e.g., an elliptical or parabolic shape.

Standard mattress designs have evolved very little in the past fifty years. A standard mattress generally includes a set of metal coil springs mounted either on a base under a foam pad, or sandwiched between a pair of foam pads. The metal springs and foam pad or pads are then covered with a batting material. The entire structure is then sewn into a cloth cover and the edges are wrapped and sewn.

The limitations of metal coil spring mattresses combined with improved quality and durability of foam products has led to the relatively recent development of the foam core mattress as a viable alternative to the coil spring mattress. A foam core mattress can provide significant improvements in body contour, elimination of pressure points, and improved comfort and support compared to conventional spring-based mattresses. A basic foam mattress typically includes one or more layers of foam having desirable properties assembled into a fabric cover which often appears identical to a standard coil metal spring mattress. A foam mattress may include a center core of relatively high resilience foam sandwiched between two layers of lower resilience foam encased in a fabric shell. This construction allows for a reversible mattress.

While foam mattresses overcome some of the disadvantages of coil spring mattresses, they exhibit other disadvantages including excessive firmness, difficulty adjusting the firmness, and a lack of air flow through the foam core trapping body heat within the mattress. There is, therefore, a continuing need for improved mattress designs overcoming the disadvantages of coil spring and foam mattresses.

BRIEF SUMMARY

Disclosed herein are mattresses including a core chassis comprising a plurality of flat springs and processes for manufacturing one or more flat springs for a chassis core.

In one embodiment, a mattress comprises a rigid or semi-rigid base sheet; a plurality of flat springs, wherein each one of the plurality of flat springs comprises a first terminal end, a second terminal end, and a flexible arcuate member extending from the first terminal end to the second terminal end, and wherein an arc defined by the arcuate member is fixedly attached to the rigid or semi-rigid base sheet; and a body support disk disposed on each one of the first and second terminal ends.

In another embodiment, a process for manufacturing one or more flat springs for a chassis core comprises providing a sheet; and forming one or more flat springs in the sheet, each flat spring having first and second arcuate portions extending from and continuously joined to the sheet at a center with each arcuate portion having a terminal end configured to support a body support disc, wherein the one or more flat springs being compressible along a longitudinal axis in response to a force applied along the longitudinal axis.

The disclosure may be understood more readily by reference to the following detailed description of the various features of the disclosure and the examples included therein.

BRIEF DESCRIPTION OF THE SEVERAL VIEWS OF THE DRAWINGS

Referring now to the figures wherein the like elements are numbered alike.

DETAILED DESCRIPTION

Figure 1:
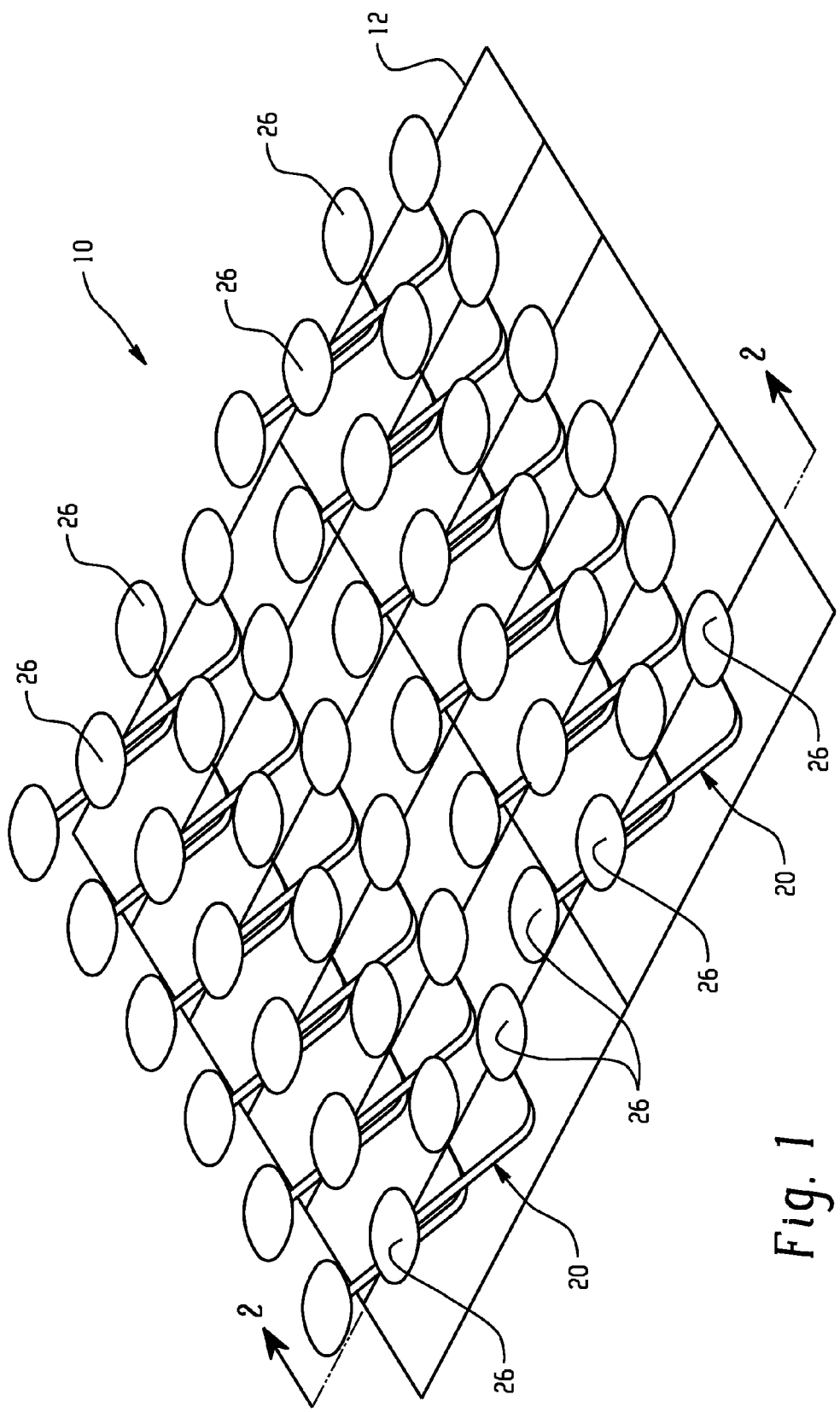
FIG. 1 depicts a partial perspective view of a chassis core for a mattress in accordance with the present disclosure.
Figure 2:
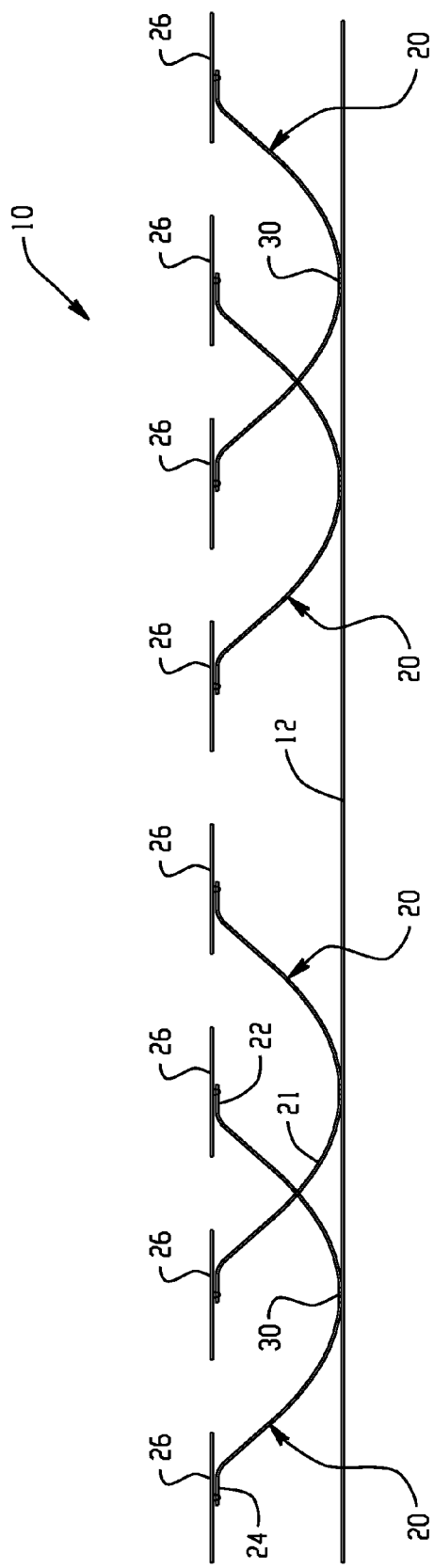
FIG. 2 depicts a sectional view taken along the lines 2-2 of FIG. 1.
Figure 3:
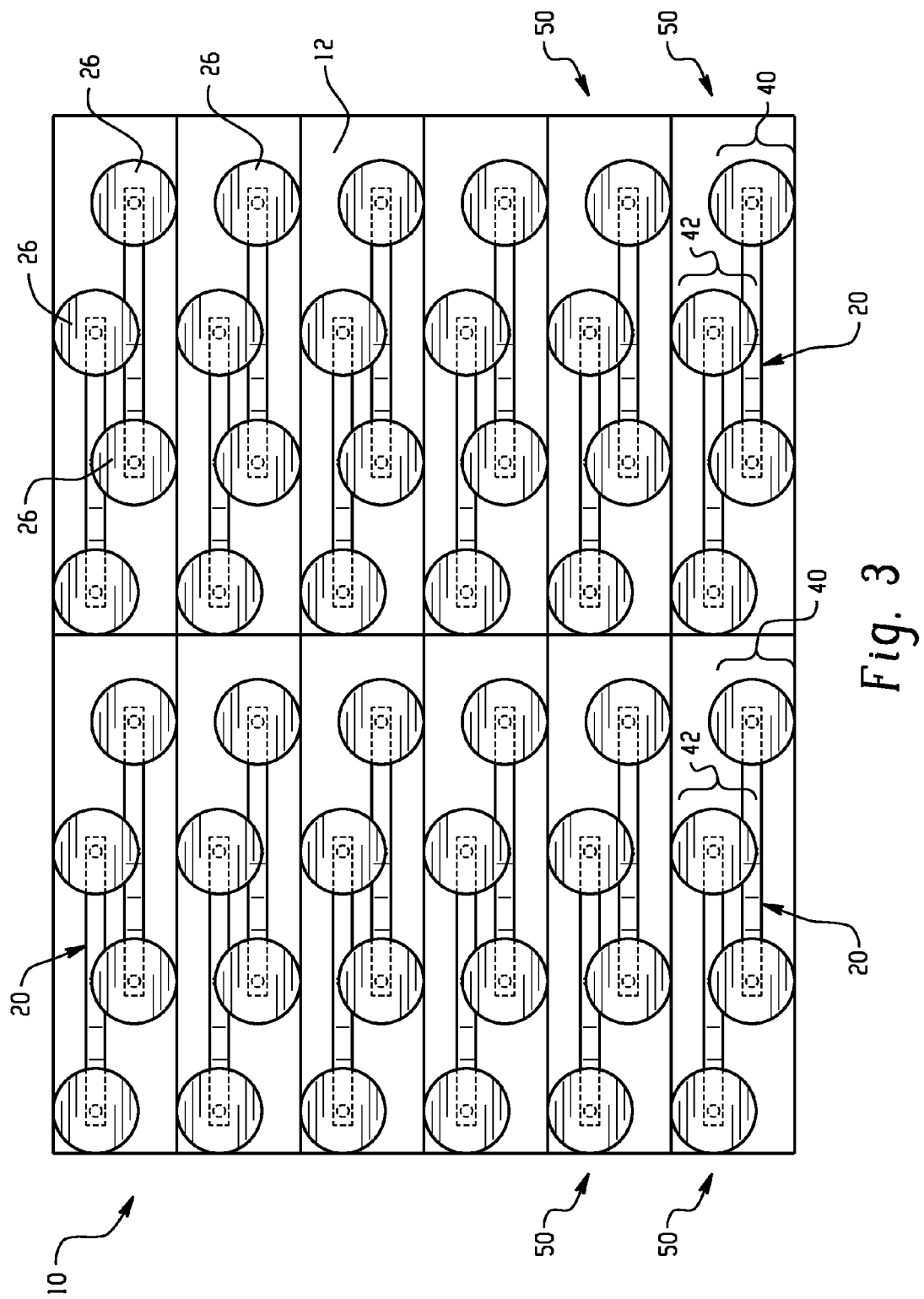
FIG. 3 is a top plan view of the chassis core of FIG. 1.

Referring now to FIGS. 1-3, there is shown various partial views of a one sided mattress generally designated by reference numeral 10. The mattress 10 generally includes a core chassis comprising a rigid or semi-rigid base sheet 12 and a plurality of flat springs 20 anchored at about a center point 30 to the rigid base sheet 12. The illustrated flat springs generally have an arcuate shape. It should be apparent that the present disclosure is not intended to limit the flat springs to any specific generally arcuate and/or geometric shape. For example, the arcuate shape of the flat springs may be elliptically shaped, parabolically shaped, and the like. Likewise, in some embodiments, the flat springs may be asymmetric meaning that the curvature, thickness, and/or length may be different for each portion of the flat spring extending from the mounting point relative to the other portion. In a similar manner, the rigid or semi-rigid base sheet 12 from which the flat springs are attached are not intended to be limited to a sheet so long as the flat springs are supported and effective to provide load support to the flat springs. For example, in some embodiments, mounting rails can be employed, wherein the mounting rails are attached to a frame.

Each of the flat springs 20 shown includes an arcuate portion 21 having first and second terminal ends 22, 24, respectively. The terminal ends are generally horizontally oriented relative to ground. Pivotably attached to each terminal end 22 and 24 is a body support disk 26. The mattress 10 further includes a top sheet, side sheet, and bottom sheets (none of which are shown) that collectively encase the parabolic springs 20, and is generally in conformance to the overall shape of the mattress.

In one embodiment, the flat springs 20 are arranged in a repeating pattern 50 of two adjacent flat springs. The two flat springs within the pattern 50 are spaced apart and parallel to one another. One of the flat springs is staggered relative to the other flat spring such that a body support disk extending from a terminal end from one parabolic spring is aligned with the mounting point (e.g., centerpoint) of the other flat spring as shown. The repeating pattern 50 results in the flat springs 20 arranged end to end in rows 40 linearly arranged from a head end to a foot end as clearly shown in FIG. 3 whereas adjacent row 42 is parallel to and in the staggered relationship to the first row 40 as described above such that one of the corresponding terminal end and body support disks of the flat springs 20 in the adjacent row are at about the center attachment point 30 of the flat springs 20 in first row 40. Alternatively, the repeating pattern may be in a side to side direction of the mattress instead of being arranged from the head end to the foot end. The pattern 50 defined by the relationship between the first row 40 and the adjacent row 42 is repeated to approximate the length and width dimensions intended for the one sided mattress. For example, the mattress 10 and the patterns defining the mattress can be configured to form twin, full or double, queen and king size mattresses. Although these particular mattresses are generally standardized in the United States in accordance with the International Sleep Products Association Voluntary Dimensional Guidelines for Bedding Product published in 2001, it should be apparent that the mattress can be configured in nonstandard sizes such as, for example, extra-long (XL) versions of the above as well as the different standard and custom sized mattresses employed in countries outside of the United States. Moreover, each twin, full, queen, king full sized mattress can vary individually in terms of size, typically on the order of a few inches.

Figure 4:
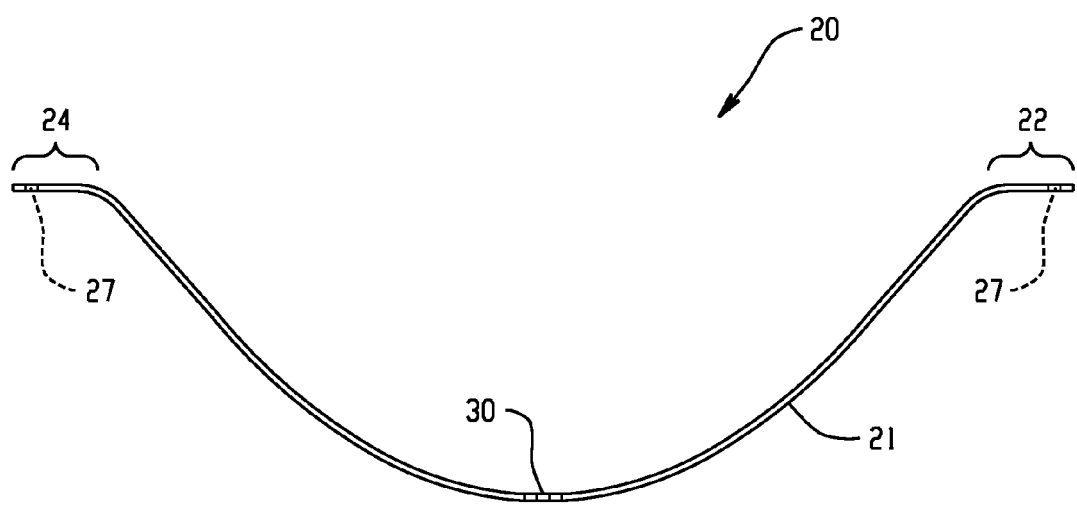
FIG. 4 is a cross section view of a parabolic spring including a parabolic portion extending between horizontally oriented terminal end portions.
Figure 5:
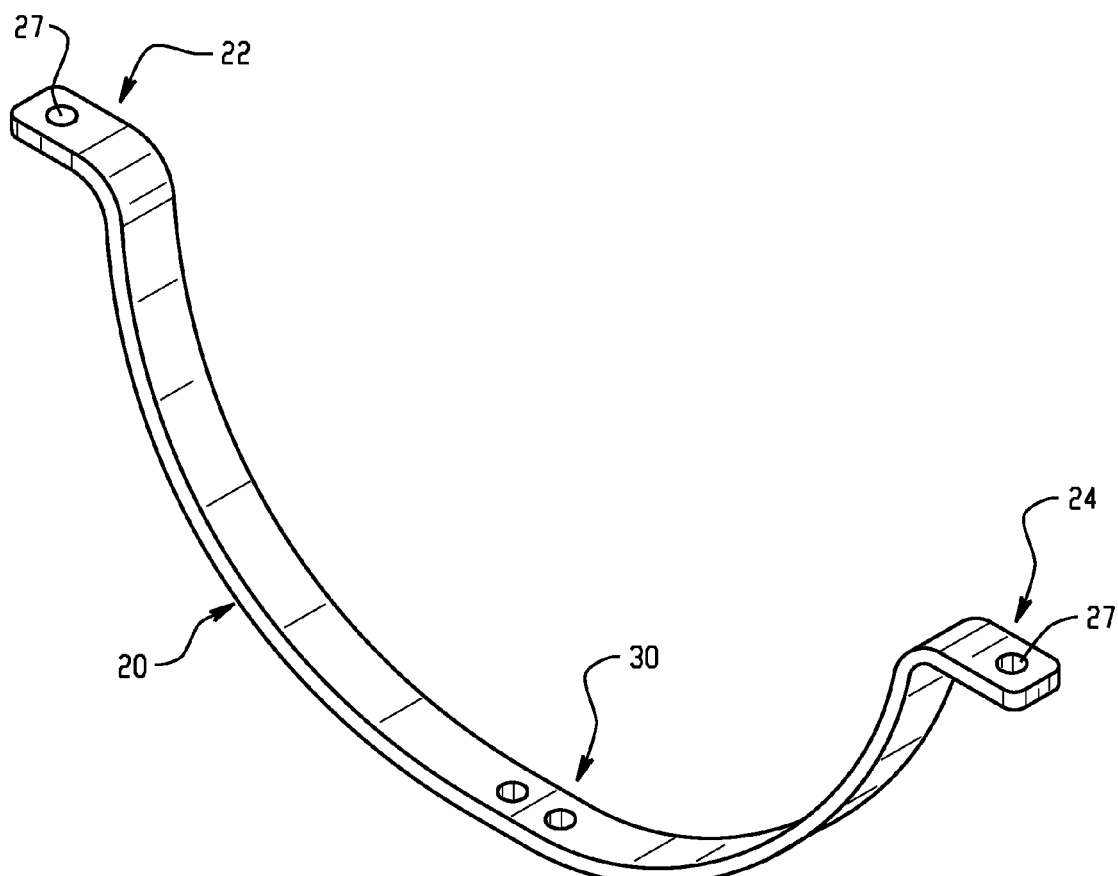
FIG. 5 is a perspective view of the parabolic spring of FIG. 4.

FIGS. 4-5 provide various views of an exemplary flat spring 20 having a parabolic shape. Each of the parabolic shaped springs 20 include a flexible parabolic portion 21, a first terminal end 22, and a second terminal end 24. The first and second terminal ends 22, 24 extend from the parabolic portion and are substantially horizontally oriented relative to ground as shown. At each terminal end 22 and 24 is attachment means 27, e.g., an aperture, for pivotably receiving the body support disk 26. An anchor point is at a centerpoint 30 of each parabolic spring 20 for fixed attachment to the rigid or semi-rigid base plate 12. The spring itself is formed of a single flexible material that has a substantially rectangular cross section. Suitable flexible materials include various metals, plastics such as fiber reinforced plastic, e.g., glass fibers/epoxy, carbon epoxy, and the like. Desirably, the material is lightweight for ease in handling. The spring dimensions will generally depend on the intended application and desired spring rate. In some embodiments, the parabolic spring without a load should provide a height of about 4 inches to about 12 inches. In other embodiments, the parabolic spring without a load should provide a height of 6 to 10 inches; and in still, other embodiments, parabolic spring without a load should provide a height of 6 to 8 inches. The material, dimensions, and mechanical properties of the parabolic springs should be selected such that the springs do not bottom out upon a typical bedding application load (i.e. while seated or laying down on the mattress).

Figure 10:
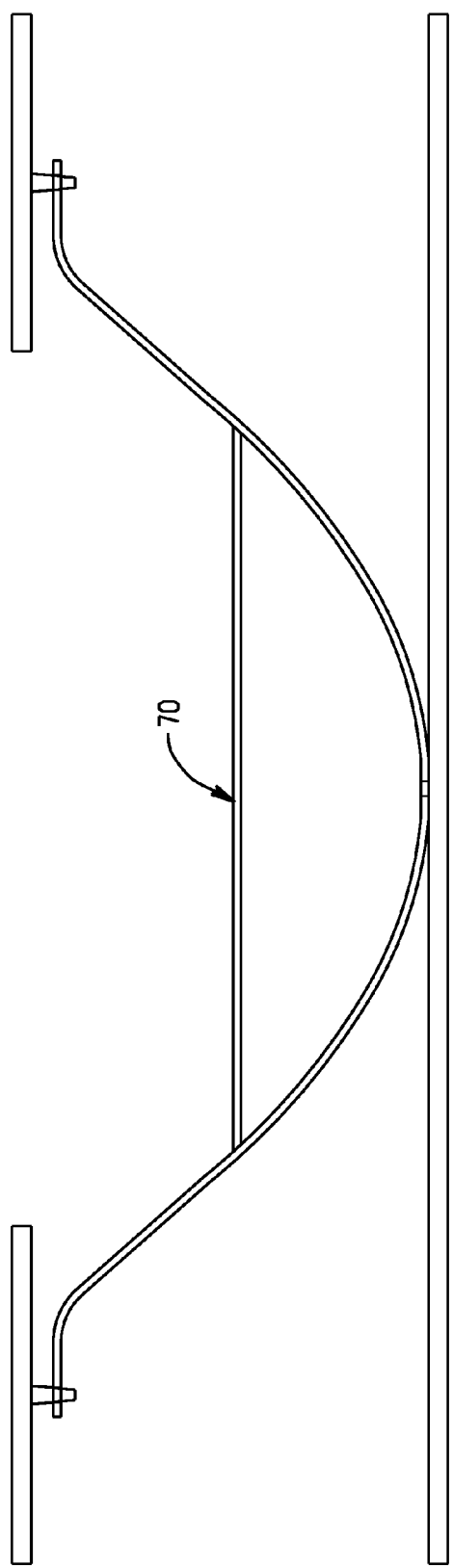
FIG. 10 illustrates a side view of a flat spring in accordance with an embodiment of the present disclosure.

Optionally, the flat springs within the core chassis may include an elastic interconnect 70 between opposing terminal ends such as is shown in FIG. 10. By way of example, the elastic interconnect may be an elastic band or spring. In still other optional embodiments, the elastic interconnect can be between adjacent flat springs. The elastic interconnect can further tailor the spring behavior as may be desired in some applications.

Figure 11A:
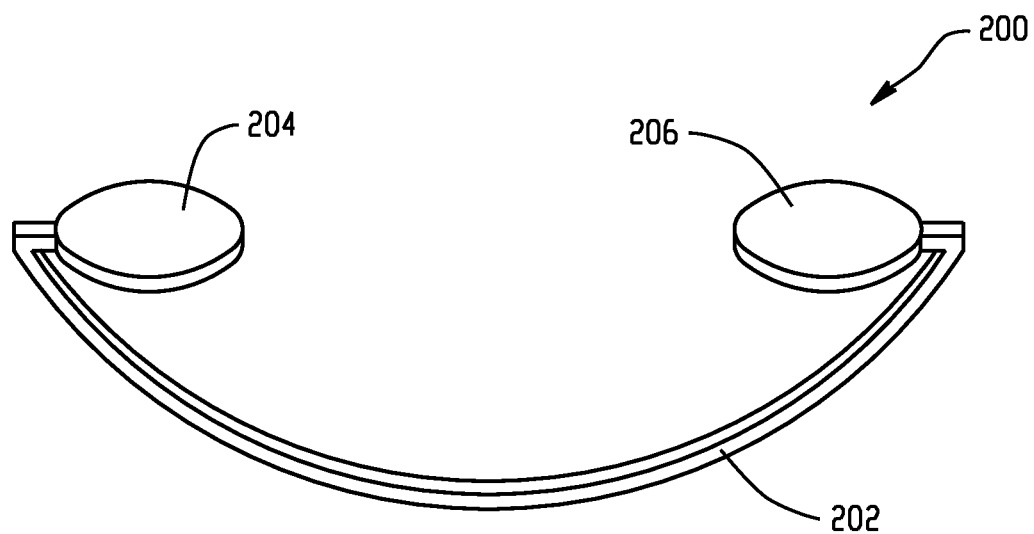
FIG. 11A depicts a perspective view of a flat spring in accordance with other embodiments.
Figure 11B:
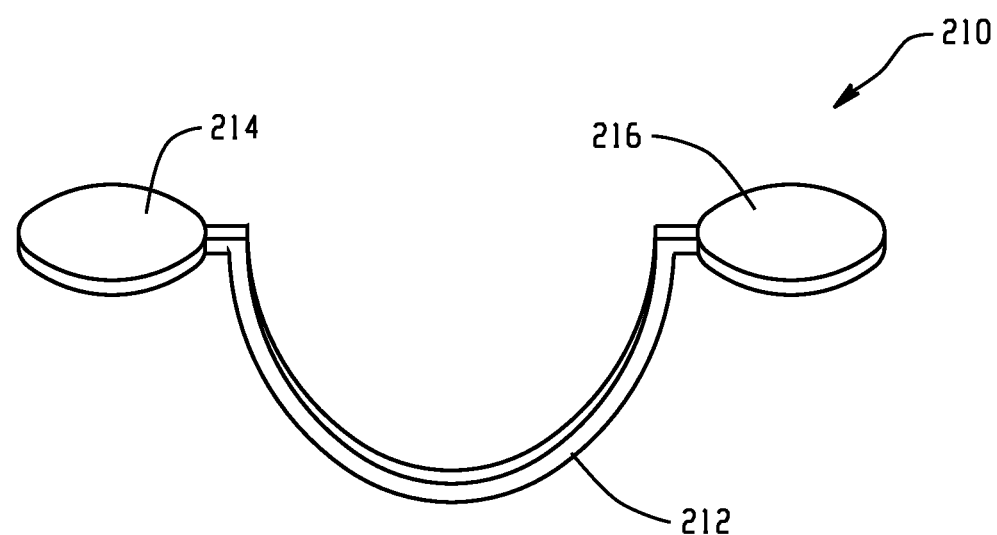
FIG. 11B also depicts a perspective view of a flat spring in accordance with other embodiments.

In accordance with another embodiment, the core chassis may include one or more flat springs 200 or 210 as are generally shown in FIGS. 11A and 11B. As shown in FIG. 11A, flat spring 200 includes a flexible arcuate member 202 and first and second terminal ends 204, 206, respectively. The integrated terminal ends are shaped and configured to provide body support, thereby replacing the need for a separate body support disc as in other embodiments. As shown, each terminal end 204, 206 is inwardly oriented relative to the arc. The particular orientation as well as the shape is not intended to be limited. For example, as shown in FIG. 11B, flat spring 210 includes first and second terminal ends 214, 216, respectively, that are outwardly oriented relative to arc defined by flexible arcuate member 212. Likewise, although the terminal ends depict an oval shape, other shapes can be utilized. is generally shown. The flat springs 200, 210 may be fixedly attached to a rigid or semi-rigid base sheet as previously described or may be rotatably coupled thereto so as to enable sufficient base plate material for the body support disc of the adjacent leaf springs. The core chassis can include arrays of flat springs 10 or 200 or 210 and combinations thereof.

Figure 8:
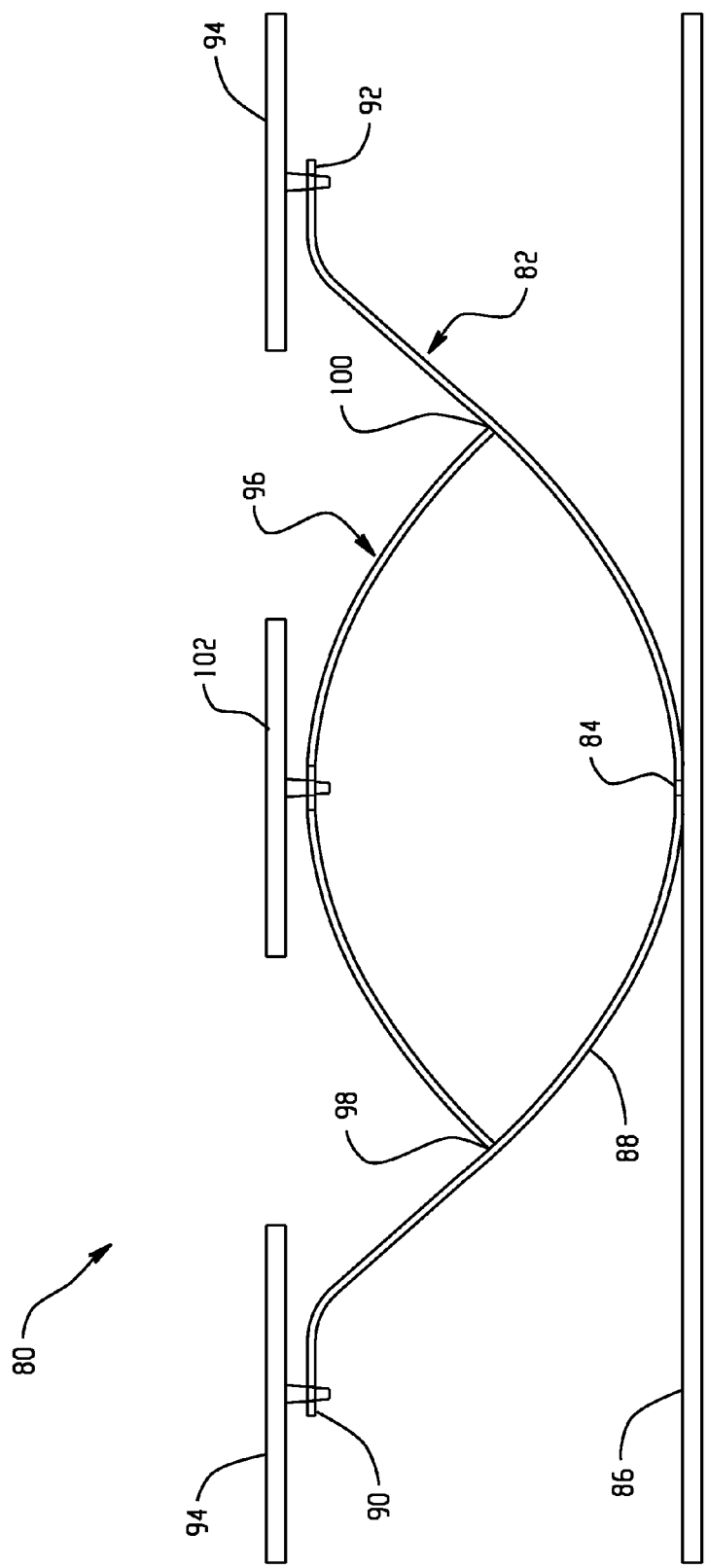
FIG. 8 depicts a side view of a chassis core for a mattress in accordance with an embodiment of the present disclosure.

In another embodiment of a core chassis 80 as shown in FIG. 8, a plurality of flat springs 82, one of which is shown, are anchored at about a center point 84 to a rigid base sheet 86 (or mounting rail, not shown). The flat springs 82 include an arcuate portion 88 having first and second terminal ends 90, 92, respectively. The terminal ends are generally horizontally oriented relative to ground. Pivotably attached to each terminal end 90 and 92 is a body support disk 94. An inverted flat spring 96 including an arcuate shape is secured at each end 98, 100 to the arcuate portion 88 of the flat spring 82. A body support disc 102 is pivotably attached at about an apex of the inverted flat spring 96. Depending on the configuration, the body support disc 102 may be of the same or different dimensions as body support discs 94.

Figure 6:
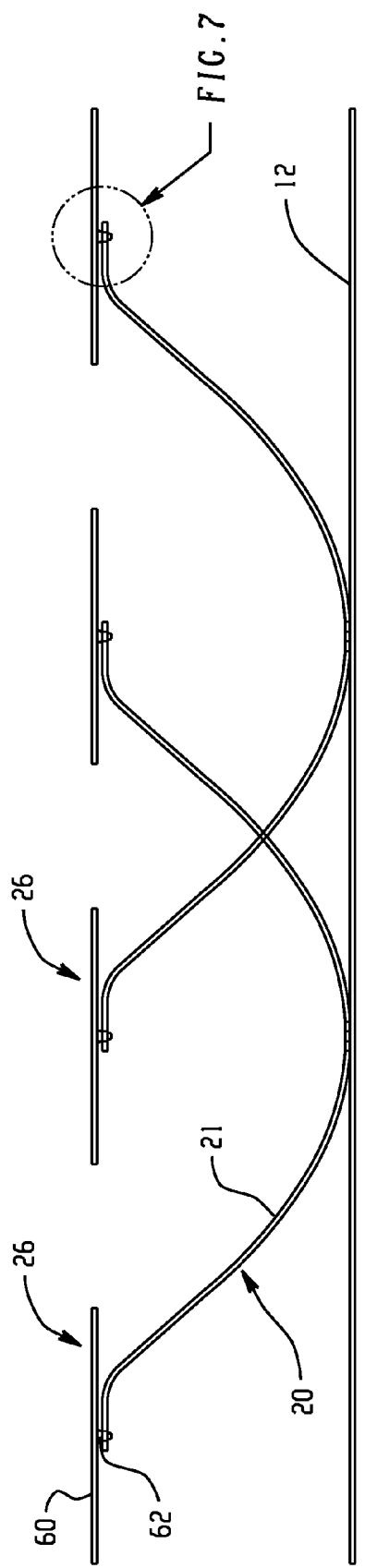
FIG. 6 is a cross sectional view of the parabolic spring and body support disk pivotably attached to terminal end portions of the parabolic spring.
Figure 7:
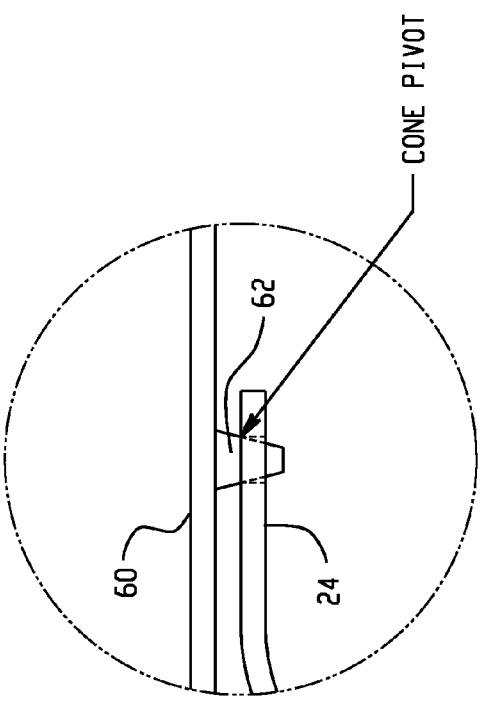
FIG. 7 is an enlarged sectional view of the body support disk.

As shown more clearly in FIGS. 6-7, the body support disk 26 generally includes a substantially planar top portion 60 and an underlying stem portion 62 for pivotal attachment to the terminal ends 22, 24 of the parabolic springs 20. In one embodiment, the stem 62 is cone-shaped having a larger diameter portion coupled to substantially planar top and tapering to a smaller diameter free end that is pivotably attached to the terminal end. The stem is not intended to be limited to the cone shape as depicted and may include other shapes, e.g., a hemispherical shape.

In one embodiment, a portion of the stem is inserted into an aperture of the terminal end. In this manner, the body support disk can tilt and pivot 360 degrees as may be desired depending on the applied load to a given surface area of the mattress. The body support disk 60 can be formed of or include an upper most surface of a low friction material such as nylon, polytetrafluoroethylene, graphite paint, silicon, polyethylene, polypropylene and the like, which will minimize wear of the top sheet as well as permit movement of the top sheet as a function of spring deflection. The substantially planar top 60 of the body support disk 60 may include rounded or beveled edges to minimize engagement with a top sheet. In response to an applied load, the body support disk laterally moves from a first position to a second position.

In other embodiments, the body support disc can include an additional axial degree of movement. For example, the height of the body support disc can be configured to be adjustable relative to the terminal end of the flat spring.

In other embodiments, a spring element is fixedly attached to each terminal end. The spring element may take the form of a coil spring, a foam pad, a smaller scale flat spring having the center point attached to the terminal end, or the like. Depending on the particular configuration of the spring element, the spring element may further include a planar support surface.

As depicted in FIG. 1, the substantially planar top 60 of the body support disk 26 has top down circular shape. However, it should be noted the overall top down shape is not intended to be limited in any way and can be of any geometric shape, e.g., a polygon shape such as a hexagonal shape. In operation, the body support disk 26 can rotate and tilt 360 degrees about its axis, which will generally depend on the applied load and movement of the user. The dimensions of the body support disk should be effective to provide sufficient surface area to provide adequate support to an end user.

The base sheet 12 can be rigid or semi-rigid. Some flexibility may be desired in some embodiments to permit ease in handling the mattress such as may be desirable when navigating narrow corridors with ninety degree turns or when in use with adjustable foundation bases. The base sheet can be made of any material including but not limited to plastic, wood, metal, combinations thereof, and the like.

Figure 9:
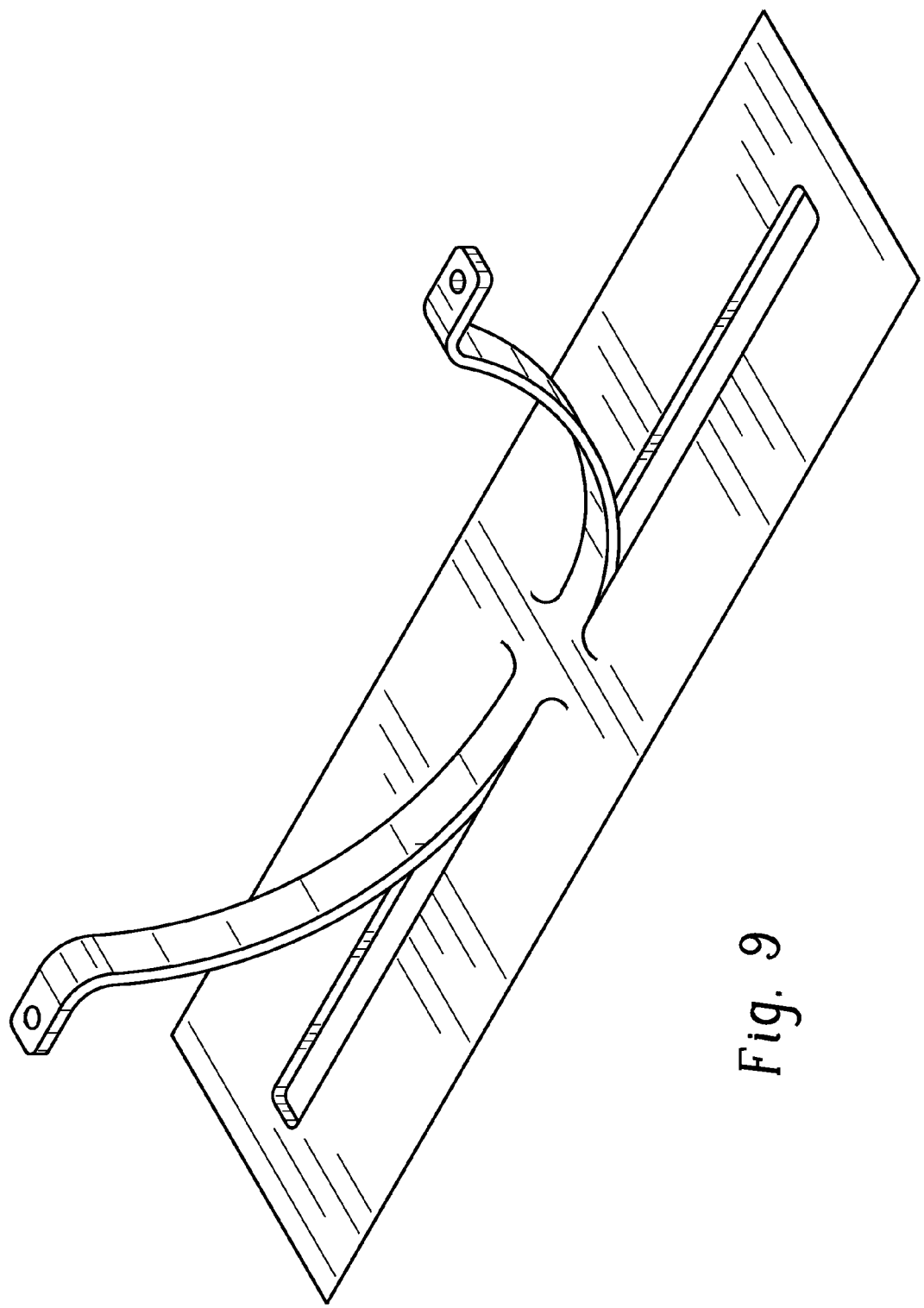
FIG. 9 depicts a flat spring formed from a sheet member in accordance with an embodiment of the present disclosure.

In one embodiment as shown in FIG. 9, the flat springs are stamped from the base sheet. Typically, the sheet is fed into an automated die, often a progressive die that can take in feedstock sheets and punch and bend the stock Springs are then formed from the partially punched-out sections in the sheet member. In this method, the springs are integrally formed into the assembly and welding or other joining process is avoided. Further, the mechanical connection between the plate and the spring arises from the spring being a ribbon of plate and therefore continuously joined to the plate, making for a robust connection with the plate. Alternatively, a sheet member may be molded or otherwise formed of another material such as plastic. In certain embodiments, alternate processing steps may be inserted into the process. For example, if the sheet members or springs are to be coated with protective material, the coating process may occur at any stage prior to or after final assembly of the core chassis it should be apparent that multiple springs can be formed in each sheet. Alternatively, individual springs with the same or different properties can be formed, collectively arranged, and attached onto another sheet, which may or may not be rigid.

The top sheet (not shown) can be a relatively thin, flexible, stretchable, low friction sheet and is in sliding engagement with the body support disk to permit the body support disk to move to a different position when a load is applied to the parabolic spring. Alternatively, the top sheet may be fixedly attached to the body support discs, which can then provide lateral support when a load is applied.

Disposed about the core chassis in any of the above embodiment is a foam encasement or foam side rail assembly (not shown). The foam encasement or foam side rail assembly can be rigid or semi-rigid sections coupled to one another (or alternatively, of a one-piece construction). Each section may be composed of multiple foam layers or of a unitary foam layer. The foam encasement or foam side rail assembly may also be attached to the top sheet and the rigid base sheet. Suitable materials include a variety of plastics and reinforced plastics but more commonly polyurethane foam or polyethylene foam.

By way of example, a queen sized mattress core having a length of approximately 78.5 inches, a width of approximately 59 inches, and a height of approximately 8 inches would include 12 sets of two parabolic springs staggered in the manner discussed above to accommodate the dimensions. Each set of parabolic springs would include two parabolic springs and four body support disks. In this example, the parabolic springs have an 18 inch span and a width of ¾ inches with varied thickness to accommodate the desired spring rates needed for different firmness levels. The parabolic springs are fixedly attached at the centerpoint to the rigid or semi-rigid base plate and include an aperture at each terminal end to pivotably receive a cone stem of the body support disk By way of example, the parabolic springs can be formed of carbon fiber reinforced plastic and selected to have a Young's Modulus of 150 to 180 GPa. The body support discs can have a circular shaped planar top and underlying cone-shaped pivots that mate with the apertures at each terminal end of the parabolic spring, wherein the circular shaped planar top has a 4-inch radius, and the horizontal distance between centers of body support disks in adjacent row is 9 inches and edge to edge is 1 inch. The body support disks are configured to tilt about 1 inch about 360 degrees with force and/or movement of a user. The surface area provided by the body support disks in this particular configuration is about 2413 square inches.

The top sheet is a relatively thin, flexible, stretchable, low friction and low wear plastic that allows body support disk and parabolic spring deflection. The top sheet is adhered to side and end sheets. The side and end sheets have a length of 78.5 and 59 inches respectively. The height can vary depending on the intended application. For example, for some applications, the parabolic springs are unloaded when encased in the top sheet, side sheets, end sheets, and bottom rigid or semi-rigid base sheet. In other embodiments, the parabolic springs are pre-loaded.

The core chassis as described above may further include one or more foam layers above the top sheet and/or below the rigid or semi-rigid base sheet. Likewise, mattress ticking as conventionally utilized in mattresses may encase the core chassis and any additional foam layers.

This written description uses examples to disclose the invention, including the best mode, and also to enable any person skilled in the art to make and use the invention. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A mattress comprising:
   a rigid or semi-rigid base sheet;
   a plurality of flat springs, wherein each one of the plurality of flat springs is of a single piece construction consisting of a first terminal end, a second terminal end, and a flexible arcuate member having a parabolic shape extending from the first terminal end to the second terminal end, wherein the first and second terminal ends both extend outwardly and at an equal distance from a vertex of the arcuate member, and wherein an arc defined by the arcuate member is fixedly attached at the vertex to the rigid or semi-rigid base sheet; and a body support disk disposed on each one of the first and second terminal ends, wherein the body support disk comprises a top having a substantially planar surface and a stem, wherein the stem is pivotably attached to the terminal end and can tilt 360 degrees about an axis perpendicular to the base sheet.

2. The mattress of claim 1, wherein the plurality of flat springs are linearly arranged end-to-end in a first row and at least one parallel adjacent row, wherein the plurality of flat springs in each parallel adjacent row are staggered relative to the first row such that a selected one of the flat springs has the first or the second terminal end in alignment with center of the flat spring in the first row.

3. The mattress of claim 2, wherein an arrangement of the first row and the adjacent row is repeated to define a mattress dimension corresponding to a standard, queen, king, or custom sized mattress.

4. The mattress of claim 2, wherein the plurality of flat springs are longitudinally arranged side-to-side in a first row and at least one parallel adjacent row, wherein the plurality of flat springs in each parallel adjacent row are staggered relative to the first row such that a selected one of the flat springs has the first or the second terminal end in alignment with center of the flat spring in the first row.

5. The mattress of claim 1, wherein the stem is cone shaped.

6. The mattress of claim 1, wherein the body support disk top has a circular shape.

7. The mattress of claim 1, wherein the body support disk top has a polygon shape.

8. The mattress of claim 1, wherein the flexible arcuate member comprises a plastic or a reinforced plastic or a fiber reinforced polymer.

9. The mattress of claim 1, further comprising a flexible top sheet in sliding engagement with the body support disk.

10. The mattress of claim 1, wherein the body support disk laterally moves from a first position to a second position in response to an applied load.

11. The mattress of claim 1, wherein the body support disk comprises a top portion having a substantially planar surface and a compression spring, wherein the compression spring is pivotably attached at one end to the terminal end and at another end to the top portion, wherein the top portion can tilt 360 degrees about an axis.

12. The mattress of claim 2, wherein the linear arrangement of the flat springs extends from a head end to a foot end of the mattress.

13. The mattress of claim 2, wherein the linear arrangement of the flat springs extends from side to side of the mattress.

14. The mattress of claim 1, wherein at least one of the plurality of flat springs further comprises an elastomeric member attached to the arcuate member, wherein one end of the elastomeric member is proximate and/or at about the first terminal end and another end is proximate and/or at about the second terminal end.

15. The mattress of claim 1, further comprising an inverted flat spring coupled to the arcuate member of at least one of the plurality of flat springs, wherein one end of the inverted flat spring is coupled proximate to and/or at about the first terminal end and another end is proximate to and/or at about the second terminal end; and a body support disc disposed at about an apex of the inverted spring.

16. The mattress of claim 1, wherein the body support disk comprises a top having a substantially planar surface and a stem, wherein the stem is pivotably attached to the terminal end and can tilt 360 degrees about an axis, and wherein the height of the body support disc is adjustable.

17. The mattress of claim 1, wherein the arc defined by the arcuate member is fixedly attached to the rigid or semi-rigid base sheet at a center point.

18. The mattress of claim 1, wherein the arc defined by the arcuate member is fixedly attached to the rigid or semi-rigid base sheet at an off-center point.

19. The mattress of claim 1, wherein the flat spring has a variable thickness.

20. The mattress of claim 1, wherein the arc defined by the arcuate member is axisymmetric.

21. The mattress of claim 1, wherein the arc defined by the arcuate member is non-axisymmetric.

22. The mattress of claim 1, further comprising an elastomeric top sheet that is fixed to the body support disk.

23. A process for manufacturing one or more flat springs for a chassis core, the process comprising:

providing a sheet;

forming one or more flat springs in the sheet, each flat spring consisting of first and second arcuate portions extending from and continuously joined to the sheet with each arcuate portion having a terminal end configured to support a body support disc, wherein the first and second arcuate portions define a parabolic shape and are continuously joined at a vertex to the sheet, wherein the terminal ends extend outwardly and at an equal distance at a center point defined by the first and second arcuate portions extending from and continuously joined to the sheet, wherein the one or more flat springs being compressible along a longitudinal axis in response to a force applied along the longitudinal axis; and securing an inverted flat spring to the first and second arcuate portions to form an arcuate bridge therebetween for each of the one or more of flat springs in the sheet, wherein an apex of the inverted flat spring is configured to support the body support disc and is at a height about equal to the terminal end of each arcuate portion of the one or more flat springs.

24. The process of claim 22, wherein the one or more flat springs is composed of a plurality of layers.

25. The process of claim 23, wherein the one or more flat springs comprise multiple layers at least one of the multiple layers is a heterogeneous material.

26. The process of claim 23, wherein the first and second arcuate portions extending from and continuously joined to the sheet are at a center of an arc defined by the first and second arcuate portions.

27. The process of claim 23, wherein the first and second arcuate portions extending from and continuously joined to the sheet are off-center of an arc defined by the first and second arcuate portions.

* * * * *